United States Patent
Houle et al.

(10) Patent No.: US 12,025,053 B1
(45) Date of Patent: Jul. 2, 2024

(54) CANTILEVER STATOR VANE WITH DAMPER

(71) Applicant: Pratt & Whitney Canada Corp., Longueuil (CA)

(72) Inventors: Nicola Houle, Montreal (CA); Domenico Di Florio, Saint Lazare (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/218,683

(22) Filed: Jul. 6, 2023

(51) Int. Cl.
| | |
|---|---|
| *F02C 3/04* | (2006.01) |
| *F01D 9/04* | (2006.01) |
| *F01D 25/04* | (2006.01) |

(52) U.S. Cl.
CPC ............ *F02C 3/04* (2013.01); *F01D 9/041* (2013.01); *F01D 25/04* (2013.01); *F05D 2240/12* (2013.01); *F05D 2260/96* (2013.01)

(58) Field of Classification Search
CPC . F02C 3/04; F01D 25/04; F01D 9/041; F05D 2260/96; F05D 2240/12
See application file for complete search history.

(56) References Cited

U.S. PATENT DOCUMENTS

| | | | | |
|---|---|---|---|---|
| 4,621,976 | A | * | 11/1986 | Marshall ............ F01D 5/24 415/209.1 |
| 10,519,871 | B2 | | 12/2019 | Desjardins et al. |
| 11,428,106 | B2 | | 8/2022 | Mattheij et al. |

FOREIGN PATENT DOCUMENTS

| | | |
|---|---|---|
| CN | 203584480 U | 5/2014 |
| FR | 3057904 A1 | 4/2018 |

\* cited by examiner

*Primary Examiner* — William H Rodriguez
(74) *Attorney, Agent, or Firm* — Carlson, Gaskey & Olds, P.C.

(57) ABSTRACT

A stator vane assembly includes a support structure a support structure and a plurality of cantilever stator vanes Each cantilever stator vane of the plurality of cantilever stator vanes extends from the support structure to a distal end of that cantilever stator vane. At least one notch is formed in each of the distal ends. At least one damper is received within the at least one notch formed in each of the distal ends. A method is also disclosed.

20 Claims, 2 Drawing Sheets

CANTILEVER STATOR VANE WITH DAMPER

TECHNICAL FIELD

This present disclosure relates generally to a stator vane assembly for a gas turbine engine wherein a plurality of stator vanes include a damper.

BACKGROUND

Gas turbine engines are known, and typically include a compressor delivering compressed air into a combustor. Compressed air is mixed with fuel and ignited. Products of the combustion pass downstream over turbine rotors, driving them to rotate. The turbine rotors in turn rotate the compressor rotors and propulsor rotors such as a fan or propeller. It is desirable to avoid resonance vibrations in such components.

SUMMARY

A stator vane assembly, according to an exemplary embodiment of this disclosure, includes: a support structure; a plurality of cantilever stator vanes, each cantilever stator vane of the plurality of cantilever stator vanes extending from the support structure to a distal end of that cantilever stator vane; at least one notch formed in each of the distal ends; and at least one damper received within the at least one notch formed in each of the distal ends.

A method is also disclosed.

Although the different examples have the specific components shown in the illustrations, embodiments of this disclosure are not limited to those particular combinations. It is possible to use some of the components or features from one of the examples in combination with features or components from another one of the examples.

These and other features will be best understood from the following drawings and specification, the following is a brief description.

DETAILED DESCRIPTION

Figure 1:
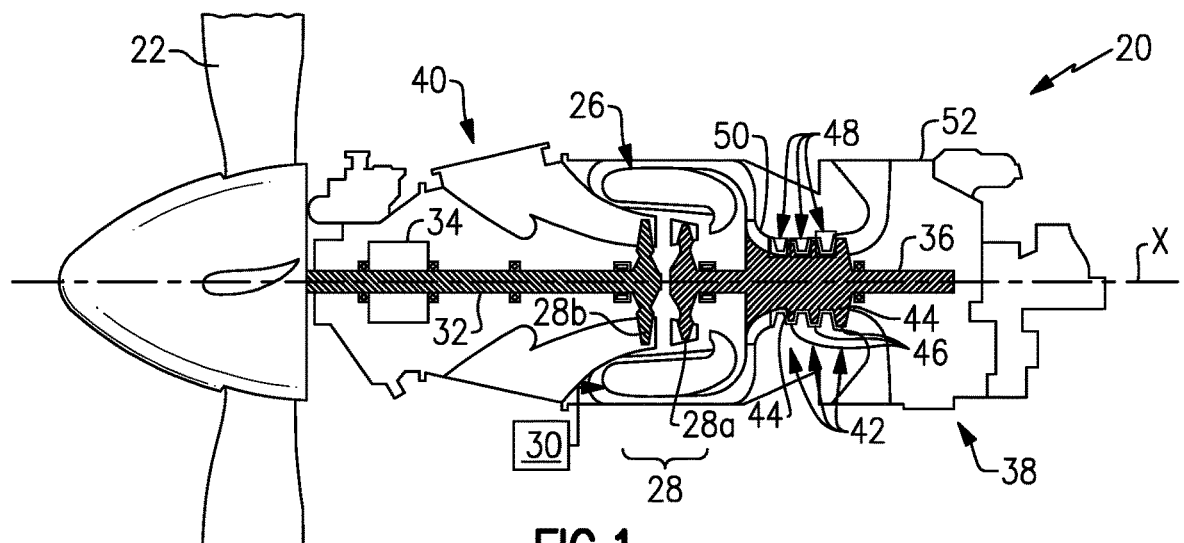
FIG. 1 schematically shows one example of a gas turbine engine.

The subject disclosure relates to a stator vane and damper assembly that is utilized in a gas turbine engine. FIG. 1 schematically illustrates a gas turbine engine 20 that is a turbo prop engine configured to drive a rotating member 22 such as an impeller, propeller, or helicopter rotor, for example. In one example, the gas turbine engine 20 generally incorporates a compressor section 24, a combustor section 26, and a turbine section 28. The combustor section 26 mixes pressurized air from the compressor section 24 and fuel from a fuel system 30 to generate hot combustion gases from which the turbine section 28 extracts energy. In this example, the turbine section 28 includes at least a first turbine 28a, which is coupled to the compressor section 24, and a second turbine 28b that drives the rotating member 22 via a drive shaft 32 and a gear box 34. The second turbine 28b comprises a power turbine that is not coupled to a shaft 36 that is associated with the compressor section 24 and the first turbine 28a.

In this example, the gas turbine engine 20 is a reverse-flow engine where a direction of flow is from an inlet 38 at a rear portion of the gas turbine engine 20 to an exhaust outlet 40 at a front portion of the gas turbine engine 20. This is different than a through-flow engine where the direction of flow is from an inlet at the front portion to an outlet at the rear portion of the gas turbine engine, such as that of a turbofan, for example. While a turbo prop configuration is depicted in the disclosed non-limiting embodiment, it should be understood that the concepts described herein are not limited to use with a turbo prop engine, as the teachings may be applied to other types of turbine engines such as turbo shafts, turbofan, industrial gas turbine engines, etc.

In a featured embodiment, the compressor section 24 includes one or more compression stages 42. In the example shown in FIG. 1, there are three compression stages 42; however, it should be understood that fewer stages or additional stages could be utilized depending upon engine type. Each stage 42 includes a rotor 44 with blades 46 that rotate about an engine center axis X. Each stage 42 also includes a set of stator vanes 48 fixed to a support structure 50, such as a ring or rim, for example. In one example, the support structure 50 is held fixed relative to an outer housing 52 that surrounds the engine center axis X. The compressor stator vanes 48 are located between the compressor rotors 44 and are upstream of the rotating member 22 for applications where the rotating member 22 is present downstream of an axial compressor 24 as shown in FIG. 1.

Figure 2:
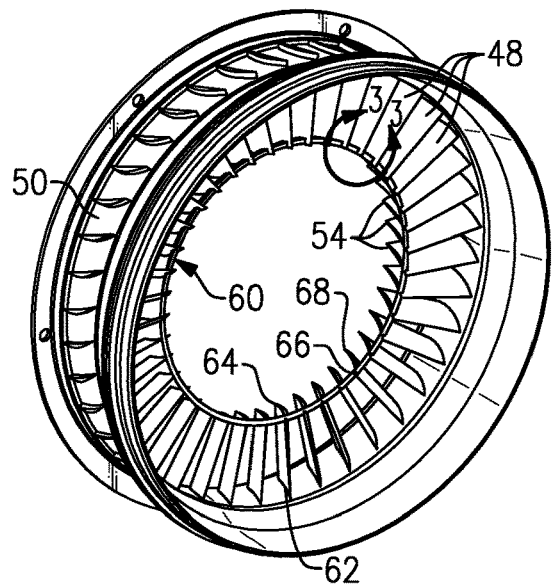
FIG. 2 shows a perspective view of a damper and stator vane assembly as used in a gas turbine engine.

FIG. 2 shows an example where the stator vanes 48 are supported only at a radially outer diameter of the gas flow path. This type of configuration is referred to as a cantilever configuration. The plurality of cantilever stator vanes 48 extend from radially outer ends at the support structure 50 to radially inner distal ends 54. In one example, at least one groove or notch 56 (FIG. 3) is formed in each of the distal ends 54. In one disclosed configuration, at least one damper 60 is received within the at least one notch 56 formed in each of the distal ends 54.

Each stator vane 48 extends along a span from a radially outer edge 62 to a radially inner edge 64. Each stator vane 48 extends from a leading edge 66 to a trailing edge 68. In one example, the notches 56 are formed in the radially inner edge 64 of each of the plurality of cantilever stator vanes 48 such that the notches 56 are open in a direction towards the engine center axis X. In one example, the notches 56 are located closer to the leading edge 66 than the trailing edge 68; however, the notches 56 could be located at other locations along the radially inner edge 64.

Figure 3:
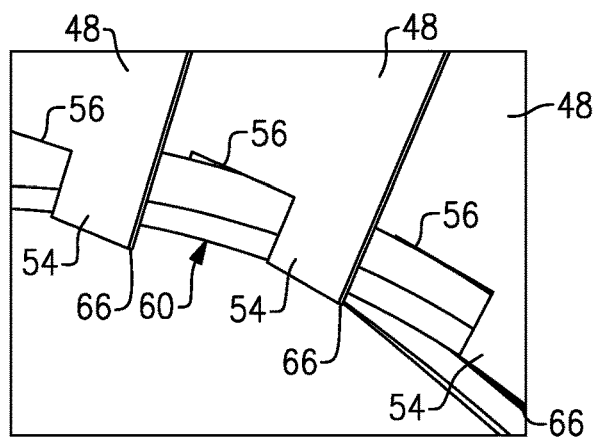
FIG. 3 is a magnified view of distal ends of stator vanes as identified in FIG. 2.

FIG. 3 shows a magnified view of the damper 60 as installed within the notches 56. In one example, the damper 60 comprises a split ring. In one example, the damper 60 is made from a metal material with a resiliency characteristic that allows for the damper to be easily installed within the notches 56. However, other types of resilient materials could also be used.

Figure 4:
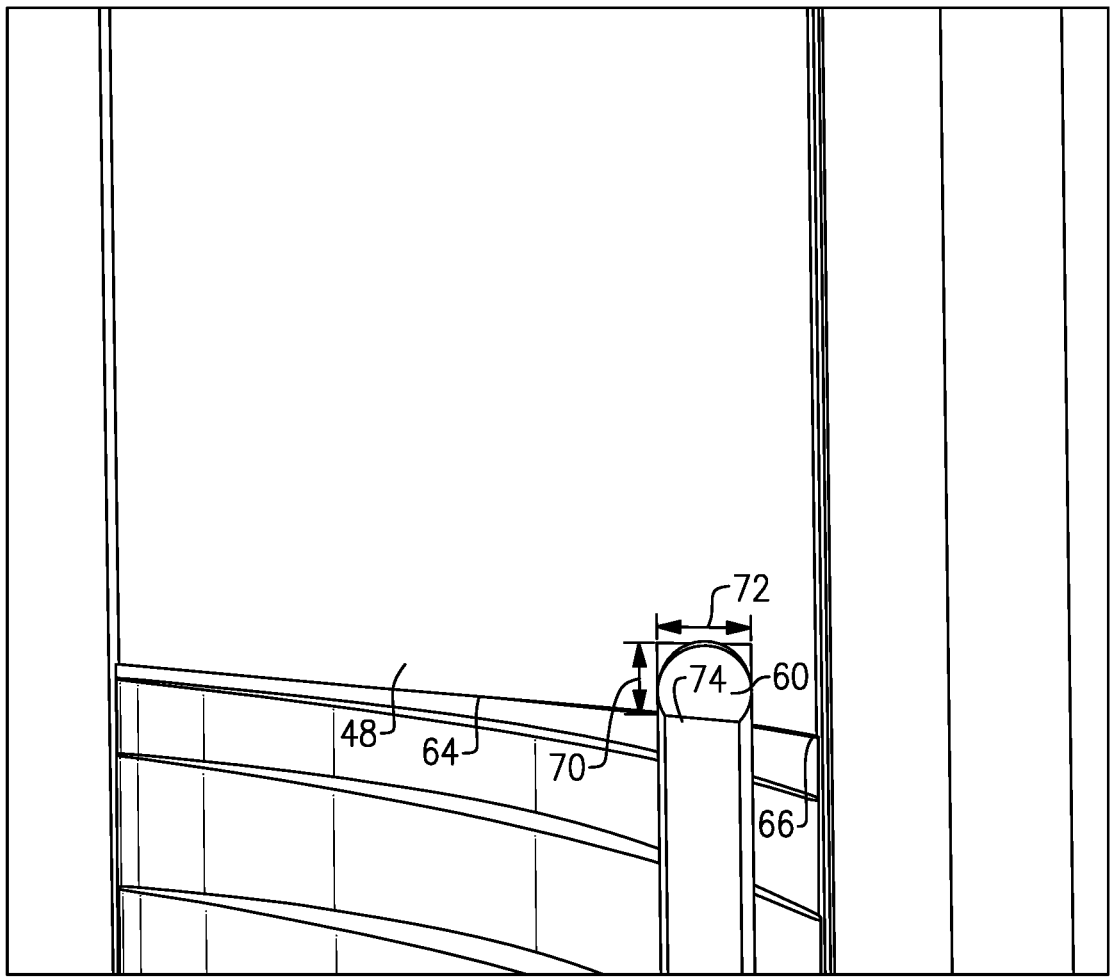
FIG. 4 is a magnified section view of the damper as installed in a notch in a distal end of a stator vane.

FIG. 4 shows an example of what a minimum dimension of the damper 60 should be for the damper 60 to be most effective. The damper 60 can have any cross-sectional shape. In one example, the damper 60 is defined by an outermost dimension extending from one side of the cross-section to an opposite side of the cross-section. In one example, the outermost dimension is at least 5% of the span as measured at a location of the associated notch 56 as indicated at 70 in FIG. 4. In one example, the outermost dimension is at least 10% of the chord length as indicated at 72 in FIG. 4.

Additionally, the damper 60 can be machined at a radially innermost surface to provide for tip clearance control. This is indicated by a machined surface 74 shown in FIG. 4. This additional machining may not be required if there is no interference between the damper 60 and the rotating blades 46.

In the configurations shown in FIGS. 2-4, there is at least one groove or notch 56 per stator vane 58 and at least one damper 60 per groove or notch 56. Additionally, the damper 60 shown in FIGS. 2-4 has a circular cross-sectional shape and the notches 56 have a polygonal shape.

Figure 5:
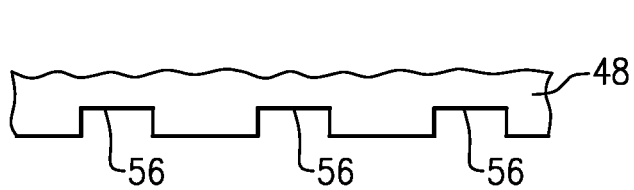
FIG. 5 is a schematic view of a vane with a plurality of notches.

FIG. 5 is a schematic view of a stator vane 48 with a plurality of notches 56. The notches 56 are discrete notches that are spaced apart from each other along the radially inner edge 64. The notches 56 can be at any axial location (chordwise) and the axial position can be decided based on mode shape.

Figure 6:
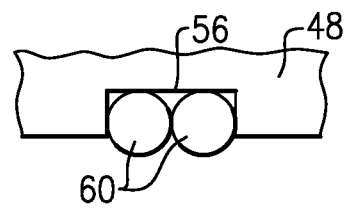
FIG. 6 is a schematic view of a notch with a plurality of dampers.

FIG. 6 is a schematic view of a notch 56 with a plurality of dampers 60. A plurality of notches 56 each having a plurality of dampers 60, i.e. a combination of FIGS. 5 and 6 is also contemplated. Further, a plurality of notches 56 could be provided with some only having a single damper 60 while others include multiple dampers 60.

Figure 7:
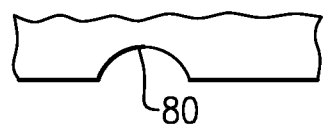
FIG. 7 is a schematic view of a curved notch.

FIG. 7 is a schematic view of a curved notch 80. The notch shape can have any cross-section such as rectangular (FIG. 3), circular (FIG. 7) or elliptical, or any other polygonal shape.

Figure 8:
FIG. 8 is a schematic view of a polygonal damper.

FIG. 8 is a schematic view of a polygonal damper 82. The damper shape can be of any cross-sectional shape such as circular (FIG. 3), elliptical, rectangular (FIG. 8), square, or any other polygonal shape. In one example, a rectangular damper can have both an associated long edge parallel to the engine center axis X or perpendicular to the engine center axis X.

In one example, the curved notch 80 can be used with the polygonal damper 82 or a damper 60 having any other shape. Additionally, any shape of damper can be used in combination with any shape of notch.

A gas turbine engine incorporating any of the above features is also disclosed and claimed. As discussed above, the gas turbine engine can be any type of gas turbine engine, and the damper and stator vane assembly can be used in any type of axial compressor. Additionally, the stator vanes 48 for each compressor stage 42 may include a damper, or only some, or one, of the stages 42 may include a damper.

In one example, the disclosure provides for a method of assembling a damper and stator vane assembly. In one example, the method includes supporting a plurality of cantilever stator vanes 48 that each extend to a distal end 54, and forming at least one notch 56 in each distal end 54. The damper 60 is contracted or compressed to an assembly position, e.g. a smaller diameter, and is then inserted into each notch 56. Once inserted, resiliency of the damper 60 automatically expands the damper 60 to a final installed position, e.g. a larger diameter.

As discussed above, the free end or distal end 54 of a cantilever stator vane 48 is at the inner diameter of the gas flow path. Thus, it is at a location of highest periodic displacement and velocity during airfoil resonance, especially for fundamental natural frequencies (e.g. first bending, first torsion, etc.). Consequently, it has been determined that it is the location where a friction damper would be the most efficient for attenuating the amplitude of an airfoil resonance. The subject disclosure provides for a cantilever stator vane assembly configuration where every vane has been notched for inserting a damper. In one example, the damper comprises a damper ring that is split such that it does not carry its own hoop stress and, also, the split facilitates installation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A stator vane assembly comprising:
    a support structure;
    a plurality of cantilever stator vanes, each cantilever stator vane of the plurality of cantilever stator vanes extending from the support structure to a distal end of that cantilever stator vane;
    at least one notch formed in each of the distal ends; and
    at least one damper received within the at least one notch formed in each of the distal ends.

2. The stator vane assembly as set forth in claim 1, wherein each cantilever stator vane of the plurality of cantilever stator vanes extends along a span of that cantilever stator vane from a radially outer edge to a radially inner edge, and wherein the at least one notch of that cantilever stator vane is formed in the radially inner edge of that of that cantilever stator vane.

3. The stator vane assembly as set forth in claim 2, wherein the at least one damper has an outermost dimension, and wherein the outermost dimension is at least 5% of the span as measured at a location of the at least one notch.

4. The stator vane assembly as set forth in claim 1, wherein each cantilever stator vane of the plurality of cantilever stator vanes has a chord length extending from a leading edge to a trailing edge of that cantilever stator vane, and wherein the at least one damper has an outermost dimension, and wherein the outermost dimension is at least 10% of the chord length of that cantilever stator vane.

5. The stator vane assembly as set forth in claim 4, wherein the at least one notch is located closer to the leading edge than the trailing edge.

6. The stator vane assembly as set forth in claim 1, wherein the plurality of cantilever stator vanes are located in a compressor section.

7. The stator vane assembly as set forth in claim 1, wherein the at least one damper comprises a split ring.

8. The stator vane assembly as set forth in claim 7, wherein the support structure is fixed to a housing that surrounds an engine center axis.

9. A gas turbine engine comprising:
    at least one turbine;
    a compressor section associated with the at least one turbine; and
    at least one compressor stage of the compressor section including a plurality of cantilever stator vanes surrounding an engine center axis, wherein each cantilever stator vane of the plurality of cantilever stator vanes extends from a support structure to a distal end of that cantilever stator vane;
    at least one notch formed in each of the distal ends; and at least one damper received within the at least one notch formed in each of the distal ends.

10. The gas turbine engine as set forth in claim 9, wherein the at least one notch formed in each distal end is open towards the engine center axis.

11. The gas turbine engine as set forth in claim 9, wherein each cantilever stator vane of the plurality of cantilever stator vanes extends along a span of that cantilever stator vane from a radially outer edge to a radially inner edge, and wherein the at least one damper has an outermost dimension, and wherein the outermost dimension is at least 5% of the span as measured at a location of the at least one notch of that cantilever stator vane.

12. The gas turbine engine as set forth in claim 9, wherein each cantilever stator vane of the plurality of cantilever stator vanes has a chord length extending from a leading edge to a trailing edge of that cantilever stator vane, and wherein the at least one damper has an outermost dimension, and wherein the outermost dimension is at least 10% of the chord length of that cantilever stator vane.

13. The gas turbine engine as set forth in claim 12, wherein the at least one notch is located closer to the leading edge than the trailing edge.

14. The gas turbine engine as set forth in claim 9, wherein the at least one damper comprises a split ring.

15. The gas turbine engine as set forth in claim 9, wherein a radially outer end of each cantilever stator vane of the plurality of cantilever stator vanes is held fixed relative to a housing that surrounds the engine center axis.

16. The gas turbine engine as set forth in claim 9, wherein the at least one compressor stage comprises a plurality of compressor stages each comprising the plurality of cantilever stator vanes with the at least one damper.

17. A method of assembling a damper and stator vane assembly comprising:
supporting a plurality of cantilever stator vanes, wherein each cantilever stator vane of the plurality of cantilever stator vanes extends to a distal end of that cantilever stator vane;
forming at least one notch in each distal end;
contracting at least one damper to an assembly position;
inserting the at least one damper in each notch; and
expanding the at least one damper to an installed position via of the at least one damper.

18. The method as set forth in claim in claim 17, including extending each cantilever stator vane of the plurality of cantilever stator vanes along a span of that cantilever stator vane from a radially outer edge to a radially inner edge, and forming the at least one damper to have an outermost dimension that is at least 5% of the span as measured at a location of the at least one notch of that cantilever stator vane.

19. The method as set forth in claim 17, including defining each cantilever stator vane of the plurality of cantilever stator vanes with a chord length that extends from a leading edge to a trailing edge of that cantilever stator vane, and forming the at least one damper with an outermost dimension that is at least 10% of the chord length of that cantilever stator vane.

20. The method as set forth in claim 17, including locating the plurality of cantilever stator vanes in a compressor section of a gas turbine engine.

* * * * *